US012323267B2

(12) United States Patent
Woodman et al.

(10) Patent No.: US 12,323,267 B2
(45) Date of Patent: Jun. 3, 2025

(54) CONFIGURABLE CONTROLLER FOR NEXT GENERATION CONTROL SYSTEM

(71) Applicant: Hamilton Sundstrand Corporation, Charlotte, NC (US)

(72) Inventors: Darren Woodman, North Granby, CT (US); Kevin G. Hawes, Tolland, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 345 days.

(21) Appl. No.: 17/878,351

(22) Filed: Aug. 1, 2022

(65) Prior Publication Data
US 2024/0039755 A1 Feb. 1, 2024

(51) Int. Cl.
*H04L 12/40* (2006.01)

(52) U.S. Cl.
CPC .. *H04L 12/40013* (2013.01); *H04L 12/40032* (2013.01); *H04L 2012/40215* (2013.01)

(58) Field of Classification Search
CPC ......... H04L 12/40013; H04L 12/40019; H04L 12/40032; H04L 2012/40215; G05B 15/02; G05B 19/0423; G05B 19/0421; G05B 2219/25257; G05B 2219/25314
See application file for complete search history.

(56) References Cited

U.S. PATENT DOCUMENTS

| 10,516,474 B1 | 12/2019 | Woodman et al. |
| 10,614,005 B1 | 4/2020 | Villano et al. |
| 11,284,540 B2 | 3/2022 | Naigertsik et al. |
| 11,366,701 B1* | 6/2022 | Morgan ............... G06F 9/5083 |
| 11,729,017 B2* | 8/2023 | Ito .......................... H04L 12/40 709/230 |
| 2002/0084173 A1* | 7/2002 | Paquette ................ B65G 43/10 198/781.06 |
| 2006/0136622 A1* | 6/2006 | Rouvelin ............. H05K 7/1432 710/62 |
| 2010/0109430 A1* | 5/2010 | DiSaverio ............... B60R 16/03 307/31 |

(Continued)

FOREIGN PATENT DOCUMENTS

CN 104750071 B 9/2017

OTHER PUBLICATIONS

Search Report issued in European Patent Application No. 23186207.9; Application Filing Date Jul. 18, 2023; Date of Mailing Dec. 20, 2023 (7 pages).

*Primary Examiner* — Rasheed Gidado
(74) *Attorney, Agent, or Firm* — CANTOR COLBURN LLP

(57) ABSTRACT

An environmental control system includes a broadcast-type controller area network (CAN) bus and a plurality of configurable modular controllers coupled to the CAN bus. Each of the plurality of configurable modular controllers includes a modular controller card with a microprocessor and a modular driver board configured to connect and disconnect to and from the controller card. The environmental control system further includes one or more sensors and a primary controller. The sensors are configured to sense one or more parameter values and to provide the one or more parameter values on the CAN bus. The primary controller is configured to communicate with each of the configurable modular controllers via the CAN bus.

13 Claims, 8 Drawing Sheets

(56) References Cited

U.S. PATENT DOCUMENTS

2013/0297042 A1* 11/2013 Reese ................ G05B 19/0426
                                                        700/3
2014/0303781 A1   10/2014 Potucek et al.
2023/0342274 A1* 10/2023 Borsini ............... G06F 11/2273

* cited by examiner

CONFIGURABLE CONTROLLER FOR NEXT GENERATION CONTROL SYSTEM

BACKGROUND

Exemplary embodiments relate generally to hardware controller architecture, and more particularly, to a configurable controller for next generation control systems.

The next generation Environmental Control and Life Support System (ECLSS) is a system of regenerative life support hardware that is currently being developed to provide clean air and water to space-traveling crew and laboratory animals through artificial means. The ECLSS includes an environmental control system (ECS) for controlling the living environment of living habitats and is being designed with the goals of establishing an increased number long-term habitants aboard a space station and/or celestial body, extending the time space travelers can remain in space, and significantly reducing the cost of operating a space station or celestial habitat.

BRIEF DESCRIPTION

According to a non-limiting embodiment, an environmental control system includes a broadcast-type controller area network (CAN) bus and a plurality of configurable modular controllers coupled to the CAN bus. Each of the plurality of configurable modular controllers includes a modular controller card with a microprocessor and a modular driver board configured to connect and disconnect to and from the controller card. The environmental control system further includes one or more sensors and a primary controller. The sensors are configured to sense one or more parameter values and to provide the one or more parameter values on the CAN bus. The primary controller is configured to communicate with each of the configurable modular controllers via the CAN bus In addition to one or more of the features described herein, the modular controller card includes a microprocessor.

In addition to one or more of the features described herein, the modular driver board includes electronics dedicated to driving a dedicated load.

In addition to one or more of the features described herein, the ECS further comprises a mass storage device in signal communication with the CAN bus and configured to store a plurality of different types of driver software, wherein each driver software is dedicated to driving a different type of load.

In addition to one or more of the features described herein, the primary controller determines the dedicated load in response to establishing signal communication between the modular controller card and the modular driver board.

In addition to one or more of the features described herein, the primary controller obtains from the mass storage device the driver software corresponding to the dedicated load in response to establishing the signal communication between the between the modular controller card and the modular driver board, and loads the driver software in the microcontroller.

In addition to one or more of the features described herein, the microcontroller drives the dedicated electronics included on the modular driver board connected to the modular driver board.

In addition to one or more of the features described herein, the ECS further comprises one or more sensors configured to sense one or more parameter values and to provide the one or more parameter values on the CAN bus, and wherein the primary controller supervises each of the plurality of configurable modular controllers and commands the microprocessor of each of the modular controller cards to implement the control operation based on one or more of the one or more parameter values from one or more of the one or more sensors.

According to another non-limiting embodiment, a configurable modular controller comprise a modular controller card including a microprocessor, and a modular driver board configured to connect and disconnect to and from the controller card. The modular driver board includes electronics dedicated to drive a load connected thereto.

In addition to one or more of the features described herein, the microprocessor is configured to store a plurality of different types of driver software, wherein each type of driver software is dedicated to driving the load connected to the modular driving board.

In addition to one or more of the features described herein, the modular driving board further includes a bootloader module configured to determine the type of driver software in response to connecting the modular driver board to the modular controller card.

In addition to one or more of the features described herein, the bootloader module communicates with a primary controller and requests the type of driver software in response to connecting the modular driver board to the modular controller card.

In addition to one or more of the features described herein, wherein the bootloader module receives the type of driver software from the primary controller in response to the request, and loads the type of driver software into the microcontroller included on the modular controller card.

In addition to one or more of the features described, where the microcontroller included on the modular controller card controls the electronics included on the modular driver board according to the type of driver software loaded by the bootloader module.

According to yet another non-limiting embodiment, a method of programming a configurable modular controller comprises establishing signal communication between a microprocessor included on a modular controller card and a mass storage device storing a plurality of different types of driver software. Each driver software is dedicated to a different type of modular driver board dedicated to drive a load among a plurality of different modular driver boards dedicated to drive a different type of load. The method further comprises establishing signal communication between the modular controller card and a given modular driving board, delivering the driver software dedicated to the given modular driver board from the non-volatile memory to the modular controller card, and loading the driver software in the microprocessor to program the configurable modular controller.

In addition to one or more of the features described herein, the method further comprises operating the given modular driver board using the programmed configurable modular controller to drive the load.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
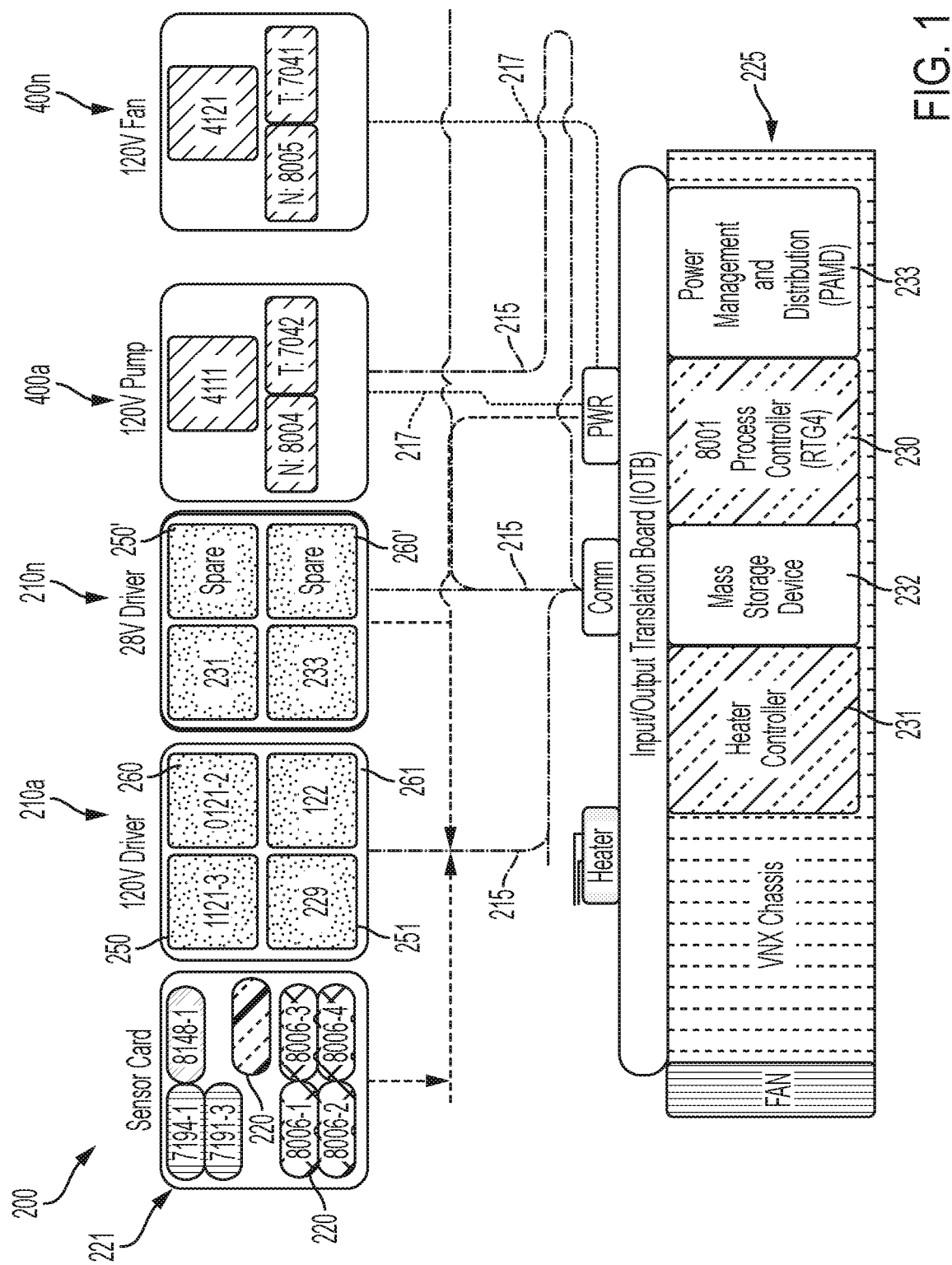
FIG. 1 is a block diagram of a next generation Environmental Control and Life Support System (ECLSS) capable of implementing one or more configurable modular controllers according to a non-limiting embodiment.

A detailed description of one or more embodiments of the disclosed apparatus and method are presented herein by way of exemplification and not limitation with reference to the Figures.

As previously noted, the next generation ECLSS will includes an environmental control system (ECS) for controlling the living environment of living habitats. Traditional ECSs include one or more controllers that are dedicated or constructed to operate according to a specific application (e.g. 120V motor drive, 28V valve drive, etc.). Thus, the controllers included in a traditional ECS are typically provided as an integrated module. That is, the controller includes a microcontroller and various electrical components integrated with the microcontroller to establish a single integrated controller to drive a corresponding specific system or load. If, however, the microcontroller and/or one or more of the electrical components fail, the entire controller (e.g., the microcontroller and all the integrated electrical components) must be replaced.

Various non-limiting embodiments of the present teachings provides an ECS of an ECLSS, where the ECS includes a configurable modular controller. The configurable modular controller includes a modular controller card installed with a microprocessor, and a modular driver board configured to connect and disconnect to and from the modular controller card. The modular driver board includes electronics dedicated to drive a load.

In one or more non-limiting embodiments, signal communication is established between the microprocessor included on the modular controller card and a non-volatile memory storing a plurality of different types of driver software. Each driver software is dedicated to a different type of modular driver board dedicated to drive a load among a plurality of different modular driver boards dedicated to drive a different type of load. Signal communication is also established between the modular controller card and a given modular driving board. The driver software dedicated to the given modular driver board is delivered from the non-volatile memory to the modular controller card and is loaded in the microprocessor to program the configurable modular controller.

Accordingly, a generic modular controller card can receive (e.g., connected with) various different types of modular driver boards based on the desired load to be controlled, and then programmed with the software dedicated for controlling the connected modular driver board. In this manner, if a microcontroller included on a modular controller card fails, the failed modular controller card can be conveniently replaced with a new generic modular controller card, which is then programmed to continue controlling and operating the load driven by the modular driver board. If one or more electrical components included on the modular driver board fail, the failed modular driver board can conveniently be replaced with a new or functioning modular driver board to continue controlling and operating the load driven by the modular driver board. In either case, a replacement of the entire modular configurable is not necessary, thereby reducing costs and/or electrical component waste.

With reference now to FIG. 1, a control system 200 (e.g., an ECS) included in a next generation Environmental Control and Life Support System (ECLSS) is illustrated according to a non-limiting embodiment. Although one example of the control system 200 is described herein as an ECS, it should be appreciated that the control system 200 can be implemented in other types of systems included in the ECLSS without departing from the scope of the invention. The control system 200 includes a primary control unit 225, a sensor module 221, one or more configurable modular controllers 210a through 210n (collectively referred to as configurable modular controllers 210), and one or more system loads 400a through 400n (collectively referred to as loads 400). The sensor module 221, each configurable modular controller 210, and each load 400 can exchange data with one another via a CAN bus 215. The control system 200 may also include a power bus 217 to supply power to one or a combination of the primary control unit 225, the sensor module 221, the configurable modular controllers 210, the loads 400. In one or more non-limiting embodiments, the power bus 217 is arranged in parallel with the CAN bus 215.

The primary control unit 225 includes a mass storage device 232 and a primary controller 230, an auxiliary controller 231 and a Power Management and Distribution (PMAD) unit 233. The mass storage device 232 can include a non-volatile memory configured to store a plurality of different types of driver software. Each driver software is dedicated to driving a different type of load 400. The auxiliary controller 231 can be employed to control an auxiliary system of the (ECLSS). For example, the auxiliary controller 231 can include a heater controller configured to control a heating system. The PMAD unit 233 is configured perform power and/or thermal management using various actively adjusted and learned models that can be stored, updated and obtained from the mass storage device 232.

The control system 200 shown in FIG. 1 includes one or more configurable modular controllers 210a through 210n (generally referred to as 210). As previously noted, the configurable modular controllers 210a through 210n may include the same software design but each may serve a different function (i.e., implement a different control operation on a different subsystem).

In one or more non-limiting embodiments, each configurable modular controller 210 includes a modular controller card 250 that can be connected with or disconnected from a modular driver board 260. One or both of the modular controller card 250 and the modular driver board 260 can be replaced by, for example, a spare modular controller card 250', a spared modular driver board 260', repurposed modular controller card, a repurposed modular driver board, or a different type of modular controller card 251/modular driver board 261 configured to control a different type of load 400. As previously noted, the exemplary configurable modular controllers 210 do not limit alternate arrangements. For example, one or more control operations may be further subdivided for control by two or more configurable modular controllers 210. As an additional example, a redundant configurable modular controller 210 can be included for one or more of the control operations.

The sensor module 221 includes drive electronics and signal conditioning to interface and/or exchange data with one or more individual sensors 220. Data collected and measured by the sensors 220 can be exchanged with modular the configurable modular controllers 210, the loads 400, and/or the primary control unit 225. In one or more non-limiting embodiments, control operations performed by the configurable modular controllers 210 can be based on data from one or more sensors 220. For example, a configurable modular controller 210a may use a carbon dioxide ($CO_2$) measurement from a carbon dioxide sensor 220 included in the sensor module 221. The sensor module 221 can include other types of sensors 220 such as, for example, pressure and temperature (PT) sensors 220, a differential pressure (dP) sensor 220, and pressure (P) sensors 220. Data from all of the sensors 220 is available to any of the configurable modular controllers 210 and to the primary controller 230 over the CAN bus 215.

The primary controller 230 may provide redundancy for each of the configurable modular controllers 210. In the case of redundant functionality in the primary controller 230, a designation may be made of whether the primary controller 230 or each configurable modular controller 210 operates in the data-free mode based on a failure of the CAN bus 215 to prevent both the primary controller 230 and each of the configurable modular controllers 210 from attempting to perform data-free control on each of the systems. In addition, one or more of the configurable modular controllers 210 can take local control if the primary controller 230 fails. When, for example, the primary controller 230 fails, the ECLSS may lose overall control of a managed state machine. In response, one or more of the configurable modular controllers 210 can initiate a local control mode and make decisions based on information exchanged from other devices connected to the CAN bus 215. Because the architecture facilitates access to all communication on the CAN bus 215 by every device (e.g., every configurable modular controller 210, primary controller 230), fault tolerance or redundancy may be established in a number of ways. That is, the architecture defined by the multiple configurable modular controllers 210, primary controller 230, and sensors 220 on a broadcast-type bus (e.g., CAN bus) offers a robust and flexible solution to withstand faults in one or more of the devices.

Figure 2A:
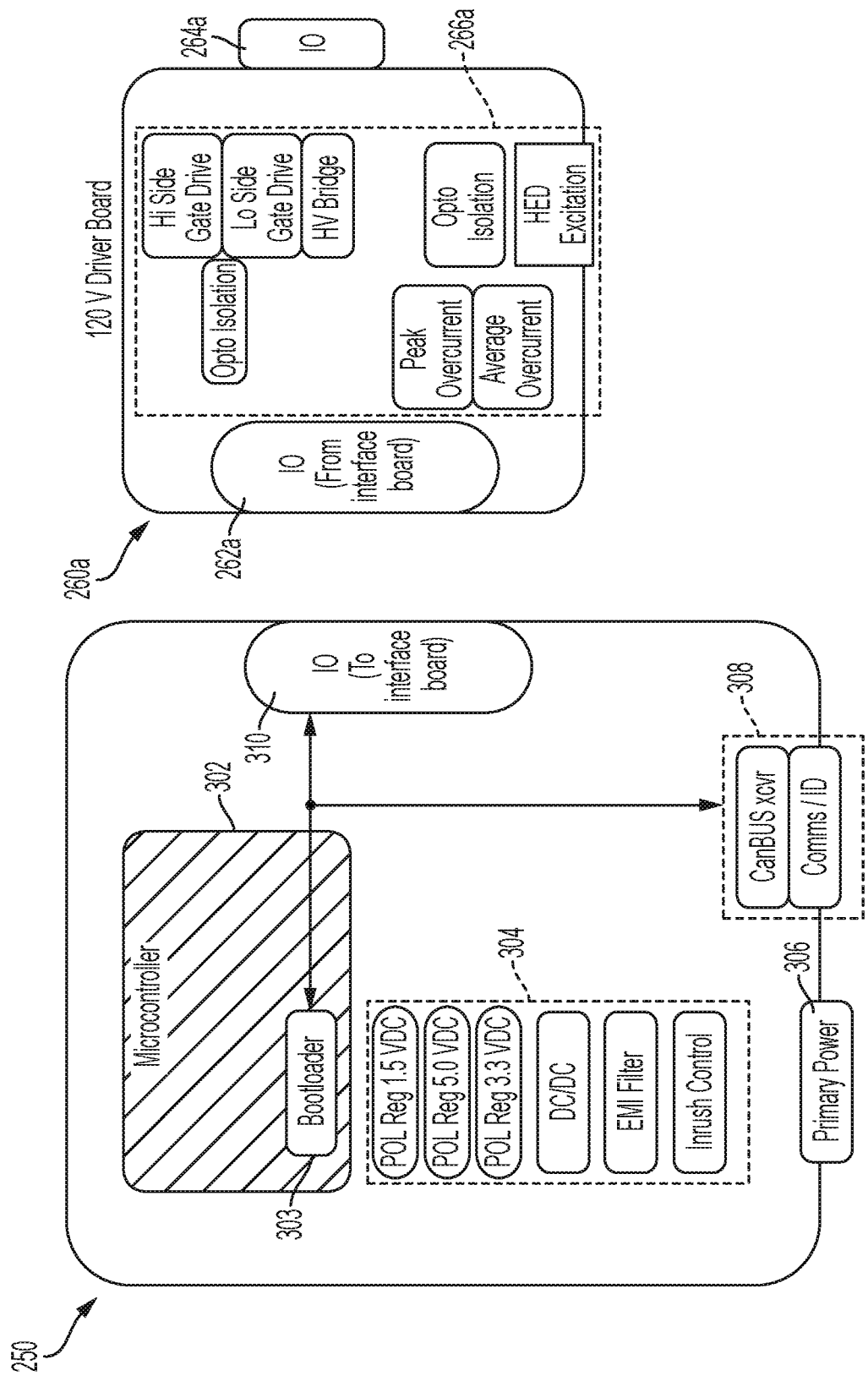
FIG. 2A depicts a configurable modular controller configured to receive various types of modular driver boards to establish a variety of controllers for controlling different sub-systems of the ECLSS shown in FIG. 1 according to a non-limiting embodiment.
Figure 2B:
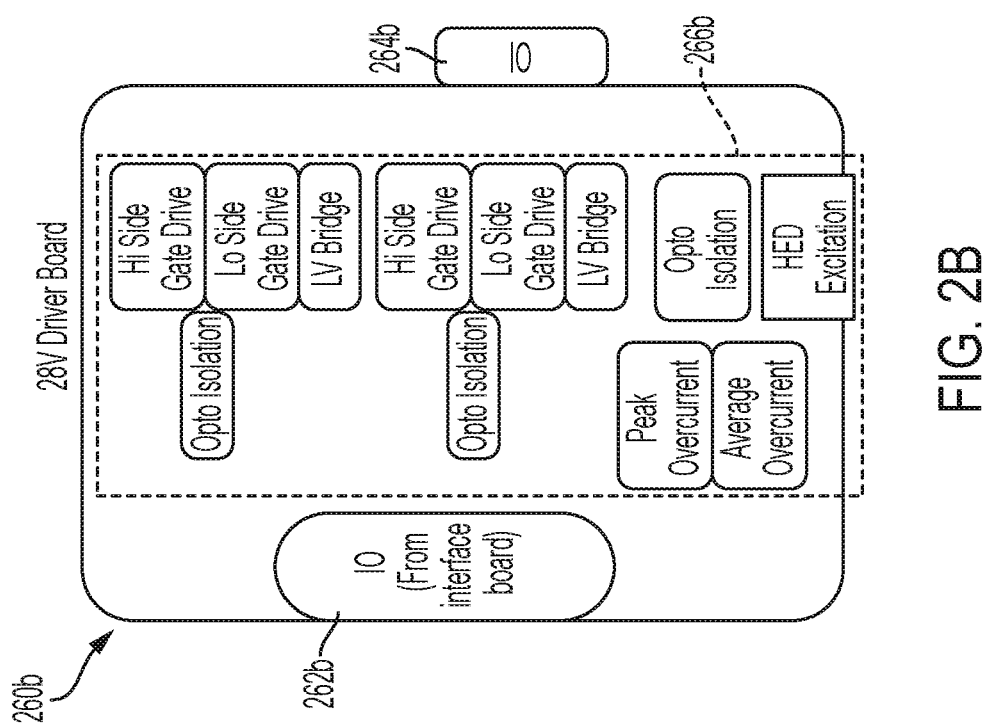
FIGS. 2B and 2C depict additional types of modular driver boards that can replace the modular driver board shown in FIG. 2A.
Figure 2C:
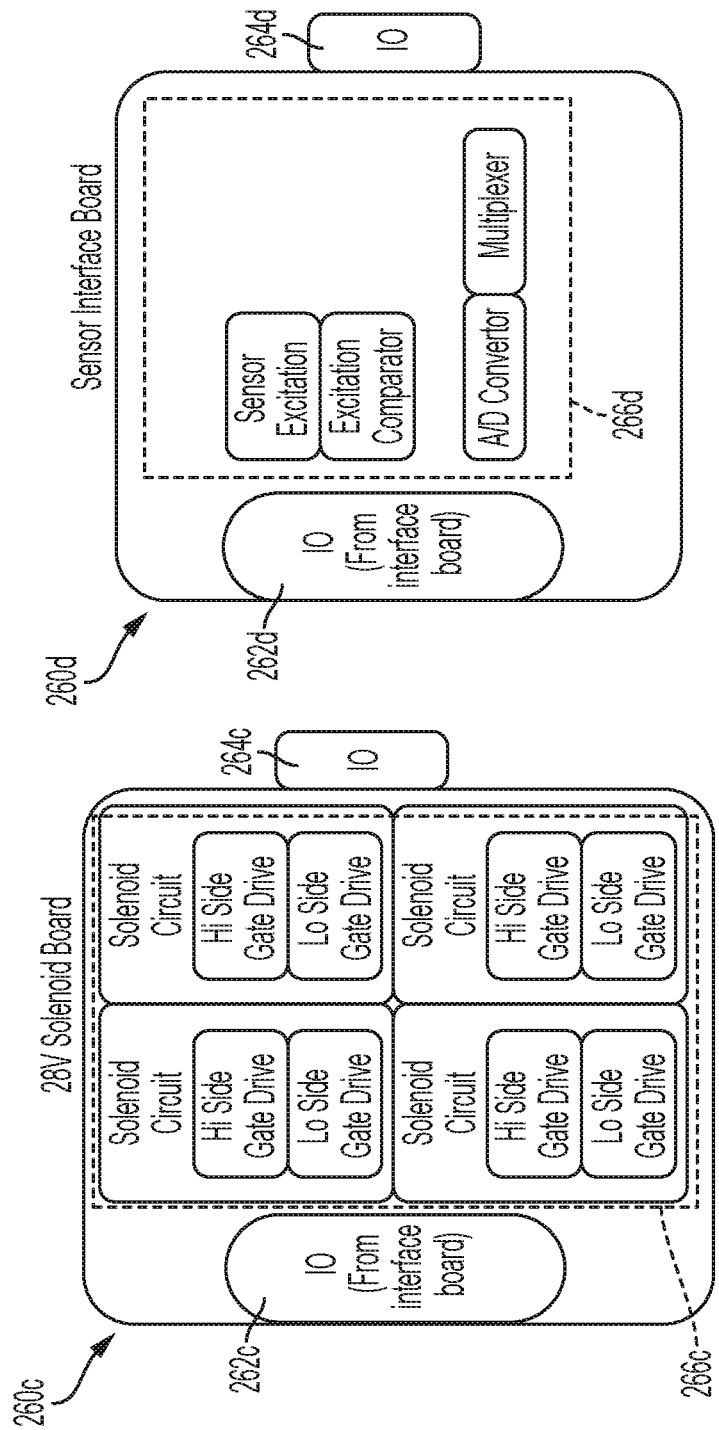

Turning now to FIGS. 2A-2C, a modular controller card 250 and one or more various types of modular driver boards 260a, 260b, 260c and 260d (collectively referred to as 260) for establishing a configurable modular controller are illustrated according to a non-limiting embodiment. As described herein, one or both of the modular controller card 250 and the modular driver board 260 can be replaced by, for example, a spare module, repurposed module, or a different type of module shown in FIGS. 2B and 2C, for example, which are configured to control a different type of load 400.

The modular controller card 250 includes a microcontroller 302, one or more controller electronic components 304, a power interface 306, a communication bus interface 308, and a driver board interface 310. The controller electronic components 304 include, but are not limited to, a voltage regulator circuit, a direct current-to-direct current (DC/DC) converter, an electromagnetic interference (EMI) filter circuit, and a current inrush control/regulator circuit. The power interface 306 is configured to establish signal communication with the power bus 217. The communication bus interface 308 is configured to establish signal communication with the CAN bus 215. The driver board interface 310 is configured to establish signal communication with a connected modular driver board 260.

In the example illustrated in FIGS. 2A-2C, the microcontroller 302 is illustrated as a generic microcontroller 302, which includes a bootloader module 303 (referred to simply as a "bootloader") but excludes any dedicated software that is dedicated to controlling or operating any of the modular driver boards 260a, 260b, 260c and 260d. The bootloader 303 can be implemented as software that is executed by the microcontroller 302, and is configured to load an operating system and/or applications on the modular controller card 250. When the modular controller card 250 is initially powered on and/or detects an initial connection of one of the modular driver boards 260a, 260b, 260c and 260d to the driver board interface 310, the bootloader 303 can facilitate a data exchange with the primary control unit 225. Identification of the modular controller card 250 can also be detected by the microcontroller 302 to determine the dedicated software can also be facilitated through a discrete ID that is obtained via the communication bus interface 308. In this manner, the bootloader 303 can obtain driver software dedicated to the given modular driver board from the mass storage device 232 and load the dedicated driver software and/or dedicated applications on the modular controller card 250. Accordingly, the modular controller card 250 and/or microcontroller 302 can be programmed to perform operations dedicated to the modular driver board 260 to establish a configurable modular controller 210 as described herein.

Each modular driver board 260 includes a card interface 262, a load interface 264, and dedicated driver electronics 266. The card interface 262 is configured to establish connection and signal communication with the modular controller card 250. The load interface 264 is configured to establish signal communication with a connected system load 400.

The dedicated driver electronics 266 are dedicated to operating and driving a specific type of system load. For example, a 120 volt (V) driver board 260a can include dedicated driver electronics 266a configured to drive a 120V load such as, for example, a 120V motor. A 28V driver board 260b can include dedicated driver electronics 266b configured to drive a 28V load such as, for example, a 28V battery. A 28V solenoid driver board 260c can include dedicated driver electronics 266c configured to drive one or more 28V solenoids. A sensor driver board 260d can include dedicated driver electronics 266d configured to driver one or more sensors 220.

Figure 3:
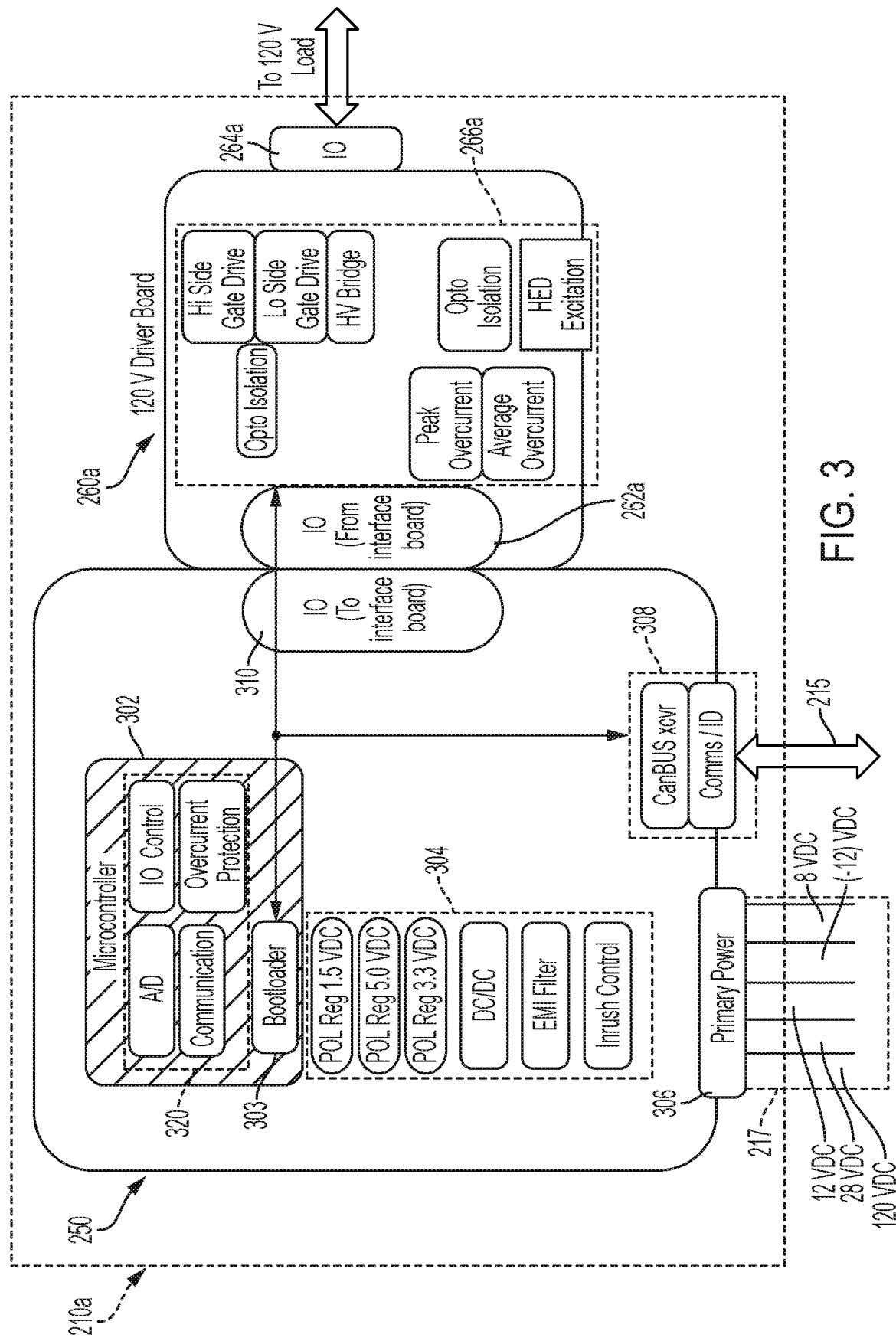
FIG. 3 depicts a dedicated modular motor driver board connected to a loaded modular controller card configured to operate the modular motor driver board to establish a configurable modular controller according to a non-limiting embodiment.

Turning now to FIG. 3, a configurable modular controller 210 is illustrated following connection between a modular controller card 250 and a modular driver board 260. Although a 120V modular driver board 260a is shown connected to the configurable modular controller 210, it should be appreciated that other modular driver boards 260 dedicated to diving a different load can be connected to the modular controller card 250 without departing from the scope of the invention.

As described herein, the configurable modular controller 210 is established after the bootloader 303 obtains dedicated driver software and/or applications 320 corresponding to the connected 120V modular driver board 260a from the mass storage device 232, via the CAN bus 215 and loads it into the microcontroller 302. In this example, the dedicated driver software and/or applications 320 includes, but is not limited to, analog-to-digital (A/D) driver software, communication software, input/output (I/O) control software, and overcurrent protection software. Accordingly, the microcontroller 302 can control the configurable modular controller 210 to perform operations that are dedicated to operating and controlling the 120V modular driver board 260a, and the 120V modular driver board 260a can drive a 120V load that is connected to the load interface 264a.

Figure 4:
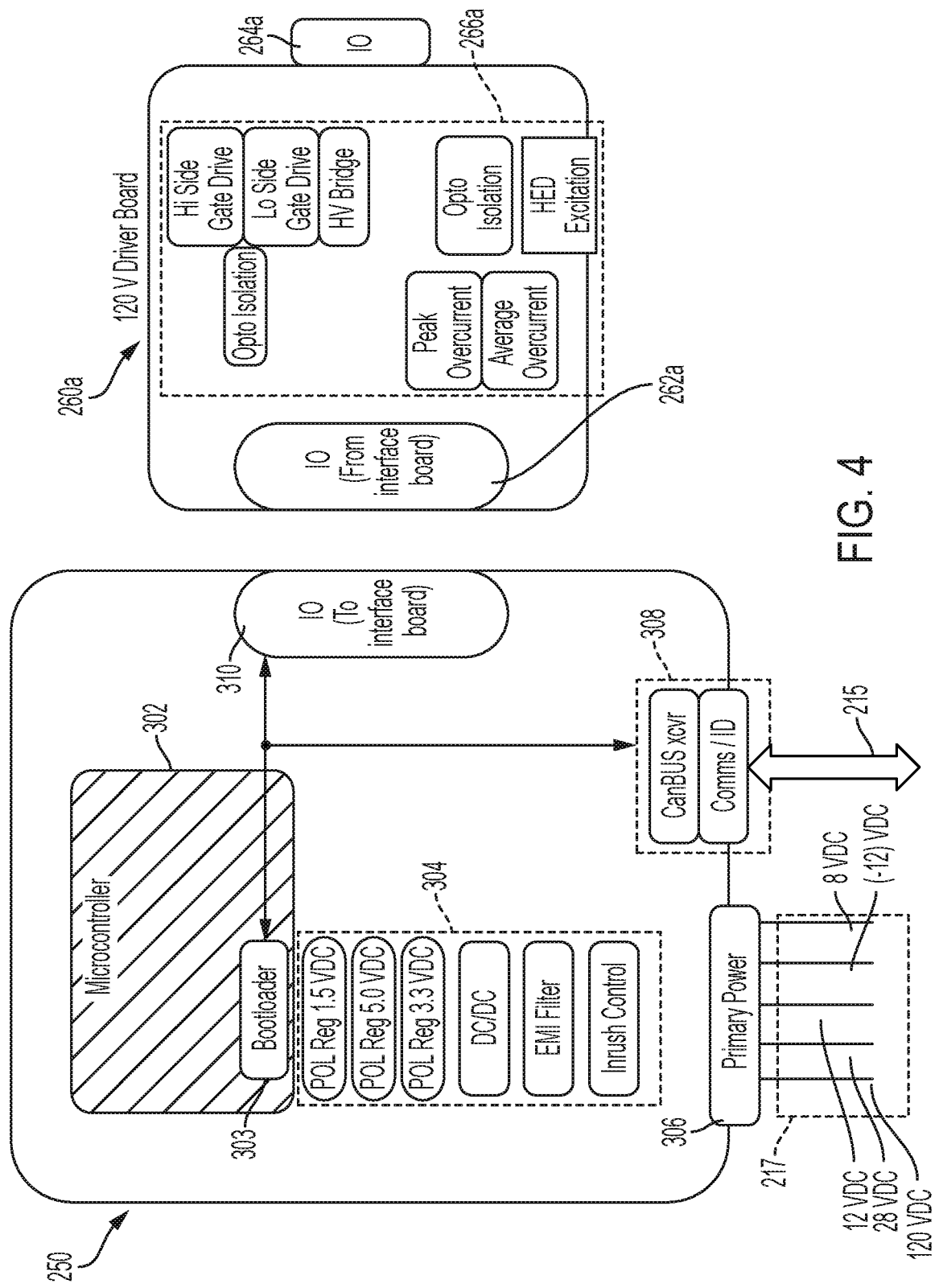
FIG. 4 depicts a generic configurable modular controller card configured to receive a dedicated modular motor driver board according to a non-limiting embodiment.
Figure 5:
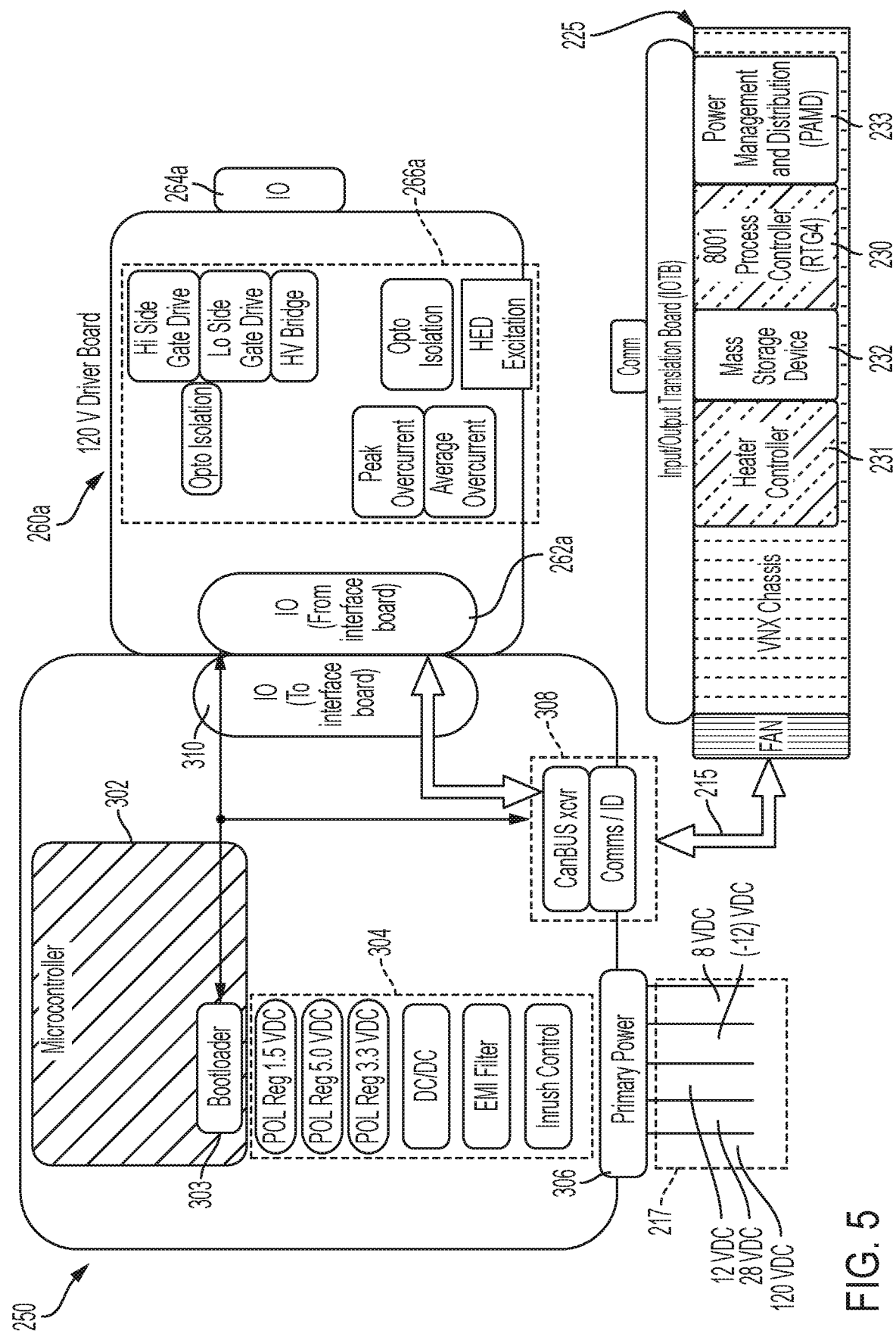
FIG. 5 depicts the configurable modular controller card exchanging data with a primary translation control unit in response to connecting the dedicated modular motor driver board according to a non-limiting embodiment.
Figure 6:
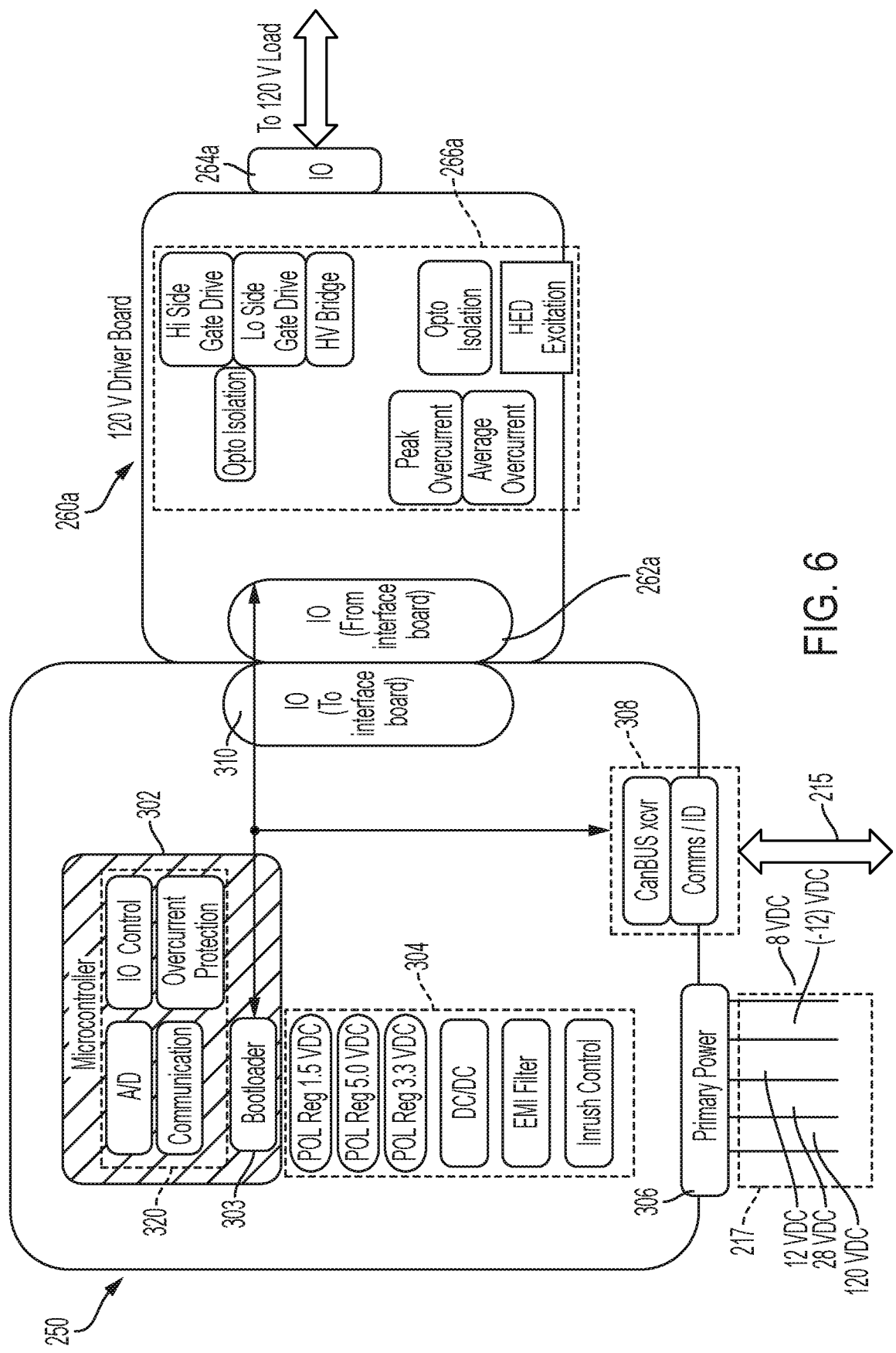
FIG. 6 depicts the configurable modular controller card programmed according to the dedicated software corresponding to the modular motor driver board to establish a configurable modular controller according to a non-limiting embodiment.

Turning now to FIGS. 4, 5 and 6, a process flow of establishing a configurable modular controller 210. In FIG. 4, a generic modular controller card 250 is connected to the power bus 217 to receive power and to the CAN bus 215 to exchange data with the primary control unit. As described herein, the modular controller card 250 is referred to as a "generic" modular controller card at this stage because the microcontroller 302 excludes any dedicated software that is dedicated to controlling or operating a specific modular driver board 260.

With continued reference to FIG. 4, a 120V modular driver board 260a is selected to establish a configurable modular controller 210 for ultimately controlling a 120V load such as, for example, a 120V motor. In this example, the 120V modular driver board 260a includes various 120V driver electronics 266a dedicated to driving the 120V load. The 120V driver electronics 266a includes, but is not limited to, opto-isolation electronics, a hi-side gate driver circuit, a lo-side gate driver circuit, a high-voltage bridge rectifier, peak overcurrent protection circuitry, average overcurrent protection circuitry, and horizontal electric dipoles (HED) excitation circuity.

Turning to FIG. 5, the generic modular controller card 250 is illustrated following electrical connection with the 120V modular driver board 260a. In response to establishing the electrical connection, the bootloader 303 directs the generic modular controller card 250 to communicate with the primary control unit 215 and request dedicated driver software and/or application stored in the mass storage device 232.

In one or more non-limiting embodiments, the primary controller unit 225 can identify that the connected modular driver board is a 120V modular driver board 260a, obtain the driver software and/or applications dedicated to operating the 120V modular driver board 260a from the mass storage device 232, and deliver the dedicated driver software and/or applications to the generic modular controller card 250. In some embodiments, the generic modular controller card 250 inform the primary control unit 225 that the connected modular driver board is a 120V modular driver board 260a. Accordingly, the primary control unit 225 can deliver the corresponding dedicated driver software and/or applications to the generic modular controller card 250 as described herein.

Referring to FIG. 6, the modular controller card 250 is illustrated after being loaded with the driver software and/or applications 320 dedicated to the 120V modular driver board 260a. That is the modular controller card 250 is no longer considered "generic" at this stage, but rather is considered a dedicated modular controller card 250 dedicated to controlling the 120V modular driver board 260a. Accordingly, a configurable modular controller 210a dedicated to controlling a 120V load is established.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system (ECS) comprising:
   a broadcast-type controller area network (CAN) bus;
   a plurality of configurable modular controllers coupled to the CAN bus, each of the plurality of configurable modular controllers including a modular controller card have a local microcontroller included therewith and a modular driver board configured to connect and disconnect to and from the controller card;
   a mass storage device in signal communication with the CAN bus and configured to store a plurality of different types of driver software, wherein each driver software is dedicated to driving a different type of load; and
   a primary controller configured to communicate with the plurality of configurable modular controllers via the CAN bus,
   wherein the primary controller obtains from the mass storage device the driver software corresponding to the dedicated load in response to establishing the signal communication between the between the modular controller card and the modular driver board, and loads the driver software in the local microcontroller.

2. The ECS of claim 1, wherein the modular driver board includes electronics dedicated to driving a dedicated load.

3. The ECS of claim 2, wherein the primary controller determines the dedicated load in response to establishing signal communication between the modular controller card and the modular driver board.

4. The ECS of claim 2, wherein the local microcontroller drives the dedicated electronics included on the modular driver board connected to the modular driver board.

5. The ECS of claim 1, wherein the ECS further comprises one or more sensors configured to sense one or more parameter values and to provide the one or more parameter values on the CAN bus,
   wherein the primary controller supervises each of the plurality of configurable modular controllers and commands the local microcontroller of each of the modular controller cards to implement the control operation based on one or more of the one or more parameter values from one or more of the one or more sensors.

6. A configurable modular controller comprising:
a modular controller card including a local microcontroller; and
   a modular driver board configured to connect and disconnect to and from the controller card, the modular driver board including electronics dedicated to drive a load connected thereto,
wherein the local microcontroller is configured to communicate with a primary controller that communicates with a mass storage device configured to store a plurality of different types of driver software, each driver software dedicated to a different type of modular driver board dedicated to drive a load among a plurality of different modular driver boards dedicated to drive a different type of load and obtains from the mass storage device driver software corresponding to the load in response to establishing the signal communication between the between the modular controller card and the modular driver board, the local microcontroller configured to receive the driver software from the primary controller, and controls the modular driver board according to the drive software received from the primary controller.

7. The configurable modular controller of claim 6, wherein the local microcontroller is configured to store a plurality of different types of driver software, wherein each type of driver software is dedicated to driving the load connected to the modular driving board.

8. The configurable modular controller of claim 7, wherein the modular driving board further includes a bootloader module configured to determine the type of driver software in response to connecting the modular driver board to the modular controller card.

9. The configurable modular controller of claim 5, wherein the bootloader module communicates with a primary controller and requests the type of driver software in response to connecting the modular driver board to the modular controller card.

10. The configurable modular controller of claim 9, wherein the bootloader module receives the type of driver software from the primary controller in response to the request, and loads the type of driver software into the microcontroller included on the modular controller card.

11. The configurable modular controller of claim 10, wherein the microcontroller included on the modular controller card controls the electronics included on the modular driver board according to the type of driver software loaded by the bootloader module.

12. A method of programming a configurable modular controller, the method comprising:
   establishing signal communication between a local microcontroller included on a modular controller card and a mass storage device storing a plurality of different types of driver software, each driver software dedicated to a different type of modular driver board dedicated to drive a load among a plurality of different modular driver boards dedicated to drive a different type of load;
   establishing signal communication between the modular controller card and a given modular driving board;
   delivering the driver software dedicated to the given modular driver board from the mass storage device to the modular controller card; and
   loading the driver software in the local microcontroller included on a modular controller card to program the configurable modular controller.

13. The method of claim 12, further comprising operating the given modular driver board using the drive software loaded in the programmed configurable modular controller to drive the load.

* * * * *